United States Patent
Parrish (10) Patent No.: US 9,675,208 B2
(45) Date of Patent: Jun. 13, 2017

(54) UNIVERSAL CROSSOVER CHANNEL FOR GAS GRILLS

(71) Applicant: LightStar Corporation, Dallas, TX (US)

(72) Inventor: Daniel Parrish, Dallas, TX (US)

(73) Assignee: LightStar Corporation, Dallas, TX (US)

(*) Notice: Subject to any disclaimer, the term of this patent is extended or adjusted under 35 U.S.C. 154(b) by 225 days.

(21) Appl. No.: 14/327,364

(22) Filed: Jul. 9, 2014

(65) Prior Publication Data

US 2015/0013663 A1 Jan. 15, 2015

Related U.S. Application Data

(60) Provisional application No. 61/844,321, filed on Jul. 9, 2013.

(51) Int. Cl.
*A47J 37/07* (2006.01)
*B23P 19/04* (2006.01)
*F23D 14/46* (2006.01)

(52) U.S. Cl.
CPC .......... *A47J 37/0713* (2013.01); *B23P 19/04* (2013.01); *F23D 14/46* (2013.01); *Y10T 29/49826* (2015.01)

(58) Field of Classification Search
CPC ....... A47J 37/0713; F23D 14/46; B23P 19/04; Y10T 29/49826
See application file for complete search history.

(56) References Cited

U.S. PATENT DOCUMENTS

| 2,993,534 A | 7/1961 | Greiner et al. |
| 4,561,419 A | 12/1985 | Koziol |
| 6,102,029 A | 8/2000 | Stephen et al. |
| 2007/0026355 A1 | 2/2007 | Cummings |
| 2009/0250048 A1* | 10/2009 | Educate .............. A47J 37/0713 126/25 R |

* cited by examiner

*Primary Examiner* — Alfred Basichas
(74) *Attorney, Agent, or Firm* — Sheppard, Mullin Richter & Hampton LLP

(57) ABSTRACT

A universal crossover channel that is adapted for use in a wide array of grills. The universal crossover includes a telescopic slide feature that allows it to be extended or shortened and brackets that can be moved both vertically and horizontally to adjust the positioning of the universal crossover channel within the grill's firebox.

15 Claims, 7 Drawing Sheets

UNIVERSAL CROSSOVER CHANNEL FOR GAS GRILLS

CROSS-REFERENCE TO RELATED APPLICATION

This application claims the benefit of U.S. Provisional Application Ser. No. 61/844,321, filed Jul. 9, 2013, the entire contents of which are herein incorporated by reference as if fully set forth herein.

TECHNICAL FIELD

This disclosure relates to the field of gas grills, and more particularly, to crossover channels used to ignite gas grill burners.

SUMMARY OF THE INVENTION

The present invention resides in a universal crossover channel for use in gas grills that may comprise a hollow, length-adjustable body having openings on a first end and a second end; a first bracket mounted proximate the first end of the hollow length-adjustable body; and a second bracket mounted proximate the second end of the hollow length-adjustable body. The first and second brackets are configured to mount the universal crossover channel on a grill, and are further configured to be compatible with a plurality of grill mounting configurations.

In one aspect of the invention, the first bracket is configured to be mounted on a first grill burner, and the second bracket is configured to be mounted on a second grill burner. In an alternative aspect, the first and second brackets are configured to be mounted to a grill firebox wall.

In another aspect of the invention, the first and second brackets are adjustably mounted to the length-adjustable body. In a further aspect, the first and second brackets are mounted to the length-adjustable body using screws, and the first and second brackets each comprise a first elongated opening to re-position the first and second brackets on the length-adjustable body. In yet a further aspect, the first and second brackets may comprise an elongated opening for mounting the universal crossover on a grill.

In another aspect of the invention, the hollow, length-adjustable body may comprise a first body segment and an extension body segment, wherein the extension body segment is inserted into the first body segment and the length of the length-adjustable body is adjusted by adjusting the position of the extension body segment within the first body segment.

The present invention may also be embodied in a method for using a universal crossover channel, the universal crossover channel comprising a hollow, length-adjustable body having openings on a first end and a second end, a first bracket adjustably mounted proximate the first end of the length-adjustable body, and a second bracket adjustably mounted proximate the second end of the length-adjustable body. The method comprises adjusting the length of the hollow, length-adjustable body, adjusting the position of the first bracket on the length-adjustable body, adjusting the position of the second bracket on the length-adjustable body, and mounting the universal crossover channel on a gas grill such that the openings on the first and second ends of the length-adjustable body are in communication with a first burner and a second burner, respectively.

BRIEF DESCRIPTION OF THE DRAWINGS

Embodiments of the present disclosure will now be described, by way of example only, with reference to the following drawings.

DETAILED DESCRIPTION

In the following description, numerous specific details are set forth to provide a thorough understanding of various embodiment of the present disclosure. It will be apparent however, to one skilled in the art that these specific details need not be employed to practice various embodiments of the present disclosure. In other instances, well known components or methods have not been described in detail to avoid unnecessarily obscuring various embodiments of the present disclosure.

Outdoor grilling is a popular way to cook food. Most conventional outdoor grills typically include a firebox mounted on a cart. One or more burners are located inside the firebox and one or more cooking surfaces are positioned above the burners to provide a surface on which to cook the food. The burners are gas burners supplied with fuel for burning, commonly in the form of an attachment to an outlet to natural gas or to a portable fuel tank filled with liquid propane (LP) gas, which is supported on the cart. The firebox usually has a pivotably attached lid.

Typically, the firebox of conventional outdoor grills is approximately rectangular in shape, having opposing front and rear walls and opposing side walls. The rear and side walls typically have upper walls as well. The burners are usually spaced horizontally apart from one another and are attached to the front and rear walls of the firebox, so that the burners extend rearward. Each burner is turned on or off and the heat setting is regulated by a corresponding knob located on a control panel of the cart.

Many grills include "crossover," or "carryover," channels connecting one burner to another. Crossover channels are typically tubular structures with openings on both ends and having openings along their length. One open end of the crossover channel is in communication with one burner, and the other open end of the crossover channel is in communication with another burner. Gas fuel is able to pass from one burner to another via the crossover channels thereby allowing the flame from one ignited burner, typically called a "primary" burner, to ignite another burner, typically called a "secondary" burner.

In order for crossover channels to work properly, they must be connected to or placed very near openings in the burners so that gas can pass from the burner into the crossover channel. As such, the length of the crossover channel must be approximately equal to the distance between burners. However, different grills have different dimensions and varying numbers of burners, which means that the position and spacing of burners may vary in different grills. Additionally, while crossover channels are typically mounted to either the burners or the firebox using screws, the positions of the mounting screws may vary from grill to grill. All of these factors result in a wide variety of crossover channels being offered for use in different grills. The present disclosure provides a universal crossover channel that may be adapted for use in a wide range of grills by adjusting the size of the crossover channel and allowing for a range of mounting options.

Figure 1A:
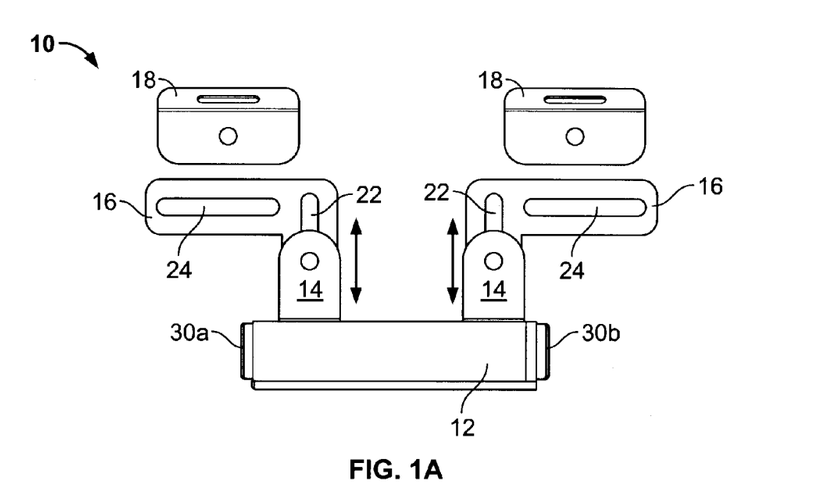
FIGS. 1A and 1B depict different configurations of a universal crossover, in accordance with an embodiment of the present invention.
Figure 1B:
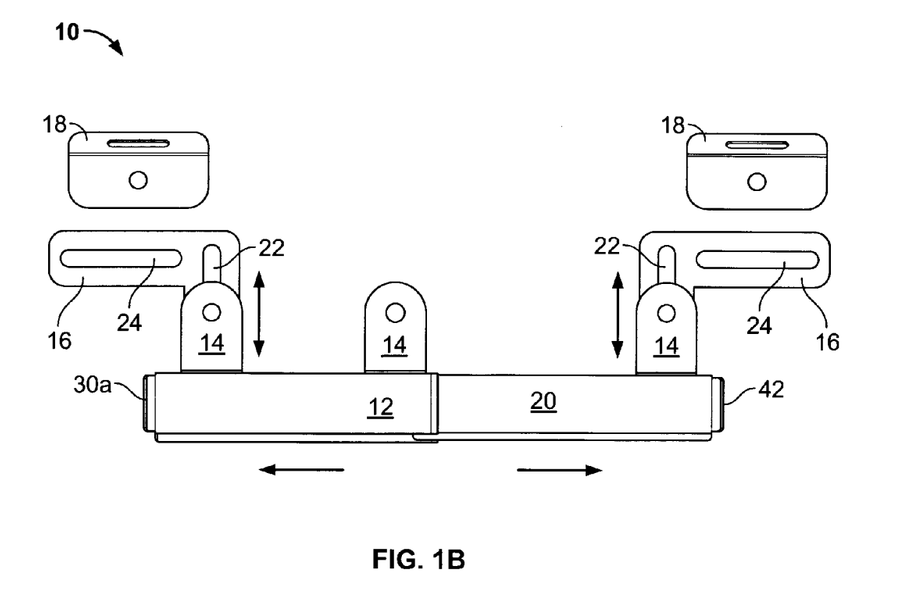

FIGS. 1A and 1B depict different configurations of a universal crossover channel 10 in accordance with an embodiment of the present disclosure. The embodiment of a universal crossover channel 10 shown in FIGS. 1A and 1B comprises a primary crossover body 12 having bracket tabs 14, mounting brackets 16, and firebox brackets 18. The universal crossover channel 10 may be made of any appropriate material, with the primary consideration being stiffness and ability to withstand the heat of being used in a gas grill. The embodiment shown in FIG. 1 is made of stainless steel.

The primary crossover body 12 is the minimum width of the universal crossover channel 10, and can be extended using a crossover extension 20. As such, the width of the primary crossover body 12 may be equal to the minimum width commonly used for gas grill crossovers. The primary crossover body 12 shown in FIG. 1 is approximately 4 inches in width, and may be used to replace a 4-inch crossover. The bracket tabs 14 are used to mount the mounting brackets 16 using a screw and a washer. The mounting brackets 16 are generally L-shaped and have a vertical opening 22 and a horizontal opening 24. The vertical openings 22 allow for the vertical positioning of the mounting brackets 16 along the bracket tabs 14. These position adjustments are primarily determined by the positioning of available mounting screw openings in the grill firebox for mounting the crossover. The vertical openings 22 allow for the vertical position to be adjusted, while the horizontal openings 24 provide flexibility in the horizontal positioning of the available screw openings. To mount the crossover channel 10, the channel is laid horizontally across two burners so that one open end of the channel 10 is in communication with one burner, and the other open end of the channel 10 is in communication with another burner. In the configuration shown in FIG. 1A, this would mean that one end 30a of the primary crossover body 12 is in communication with one burner, and the opposite end 30b of the primary crossover body 12 is in communication with another burner. The horizontal openings 24 in the mounting brackets 16 are then used to receive a screw to mount the channel 10 onto the burners with the mounting brackets 16 lying horizontally across the burners.

If the crossover mounts to the back of the grill firebox wall, then the firebox brackets 18 may be attached to the mounting brackets 16. The firebox brackets 18 are generally L-shaped and, when attached to the mounting brackets 16, allow for the crossover to be mounted on the vertical firebox wall.

If the grill has burners that are spaced further apart than the length of primary crossover body 12, then the crossover extension 20 may be inserted into the primary crossover body 12 to length the crossover 10, as shown in FIG. 1B. The crossover extension 20 has an insertion end that is configured to be inserted into one end of the primary crossover body 12, and another bracket tab 14 for receiving a mounting bracket 16. The crossover extension 20 can slide in and out of the primary crossover body 12 to adjust its length to fit the space between burners. In this particular embodiment, the crossover extension 20 is also 4 inches in length, and allows for extension of the crossover 10 to reach a length of approximately 7.5 inches. In this configuration, the left end 30a of the primary crossover body 12 is positioned to be in communication with one burner, and the right end 42 of the crossover extension 20 is positioned to be in communication with another burner.

Figure 2:
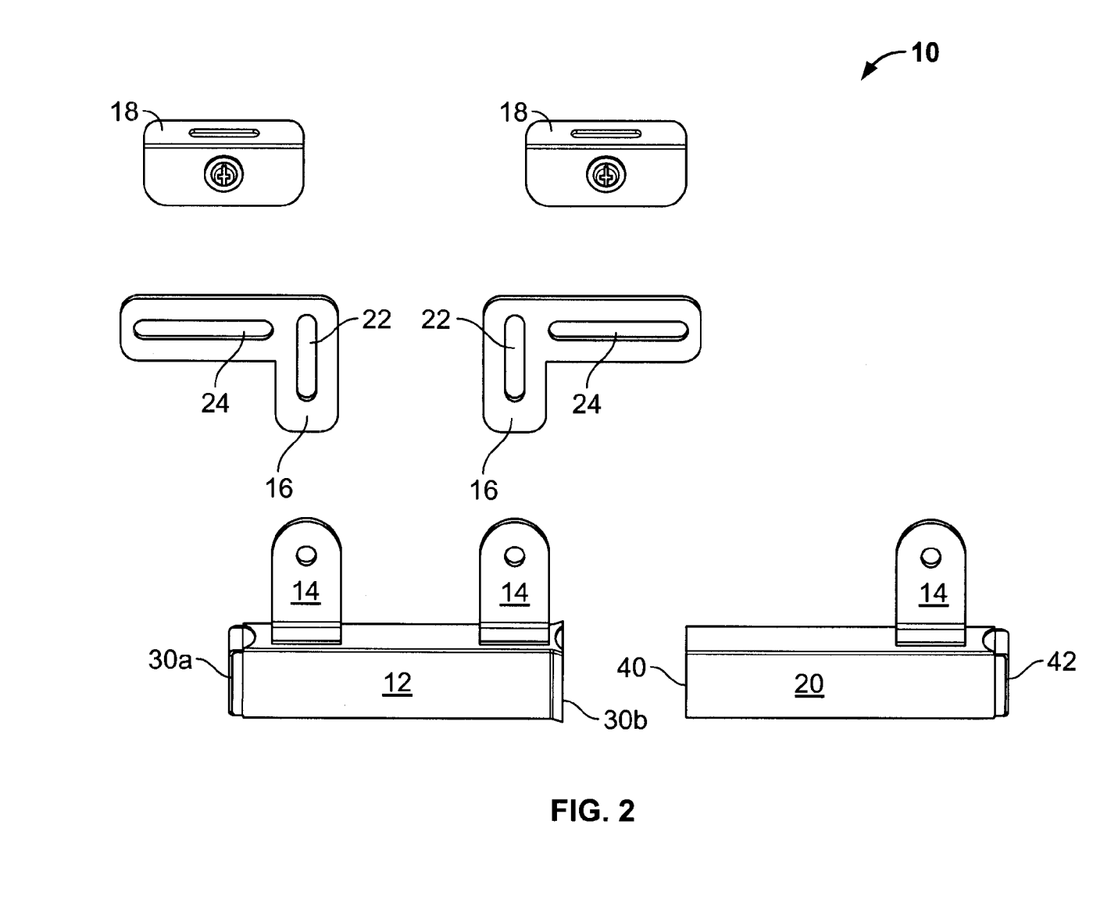
FIG. 2 is a disassembled view of the universal crossover of FIG. 1.
Figure 3:
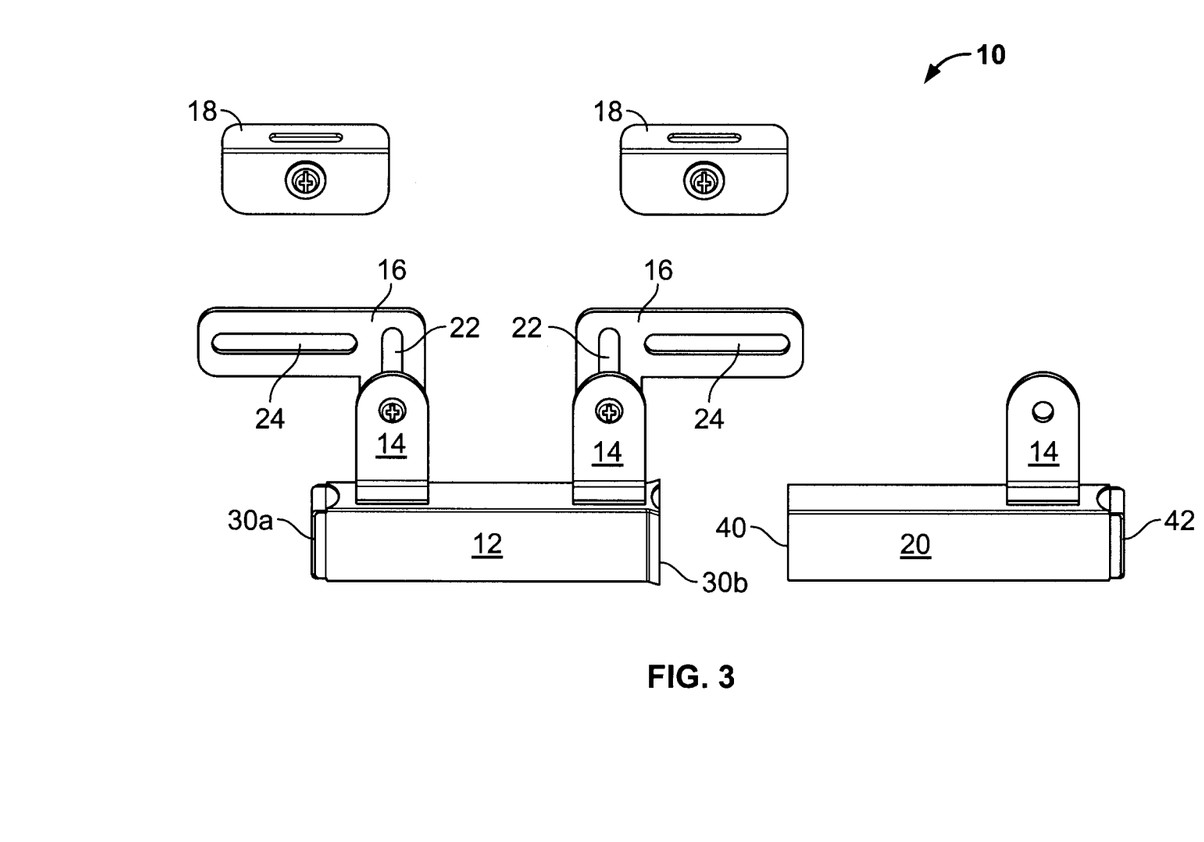
FIG. 3 is a perspective view of the universal crossover of FIG. 2 in a minimum-length assembled state.
Figure 4:
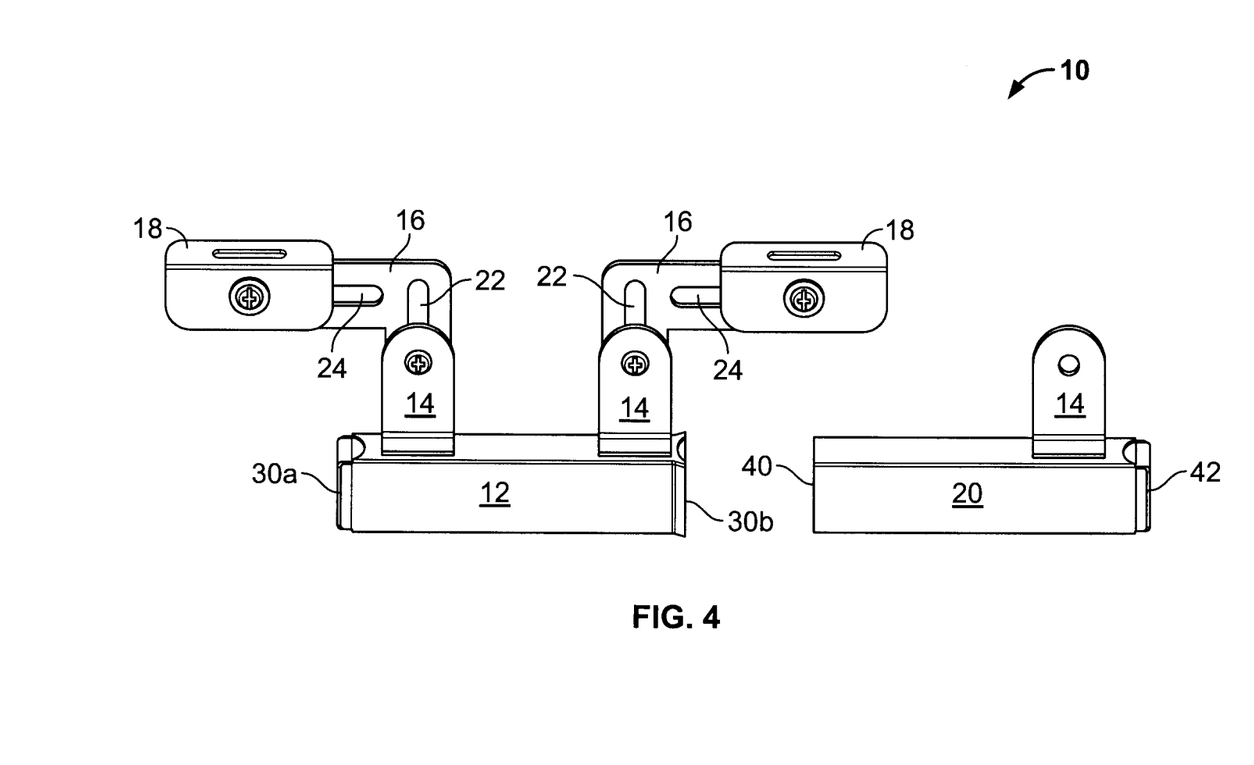
FIG. 4 is a perspective view of the universal crossover of FIG. 3 with firebox wall brackets attached.

FIGS. 2-7 depict the disclosed universal crossover channel in various states of assembly and from differing perspectives. FIG. 2 shows the crossover channel 10 completely disassembled. FIG. 3 shows the crossover channel 10 with the mounting brackets 16 attached to the primary crossover body 12. In this configuration, the crossover channel 10 can be mounted to two burners that are 4-inches apart (the length of the primary crossover body 12). FIG. 4 shows the crossover channel 10 in the same configuration, but with the firebox brackets 18 attached. In this configuration, the crossover channel 10 can be mounted on the firebox wall of a grill that has burners that are 4-inches apart.

Figure 5:
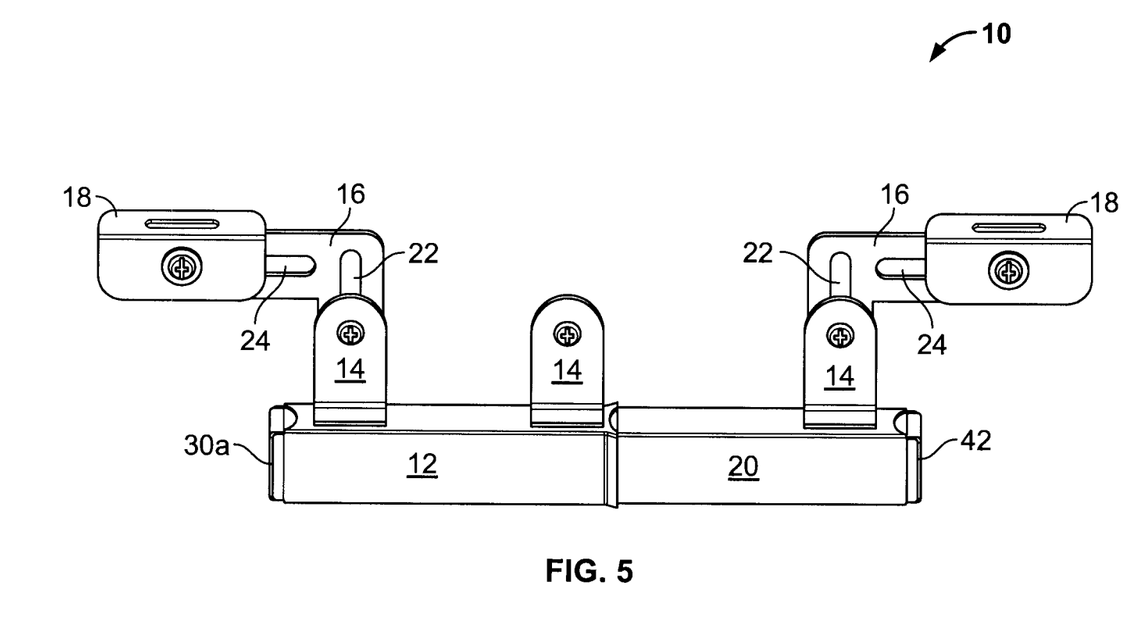
FIG. 5 is a perspective view of the universal crossover of FIG. 4 with the crossover extension assembled and extended to near-maximum length.

FIG. 5 shows the crossover channel 10 with the crossover extension 20 inserted into the primary crossover body 12, and one set of mounting brackets mounted on the crossover extension 20. In the embodiment shown in the figures, the primary crossover body 12 is 4-inches in length, and the crossover extension 20 is also 4-inches in length. In this configuration, the crossover channel 10 can be adjusted to have any length from 4 inches (primary crossover body 12 by itself) to approximately 7.5 inches (crossover extension 20 fully extended out).

Figure 6:
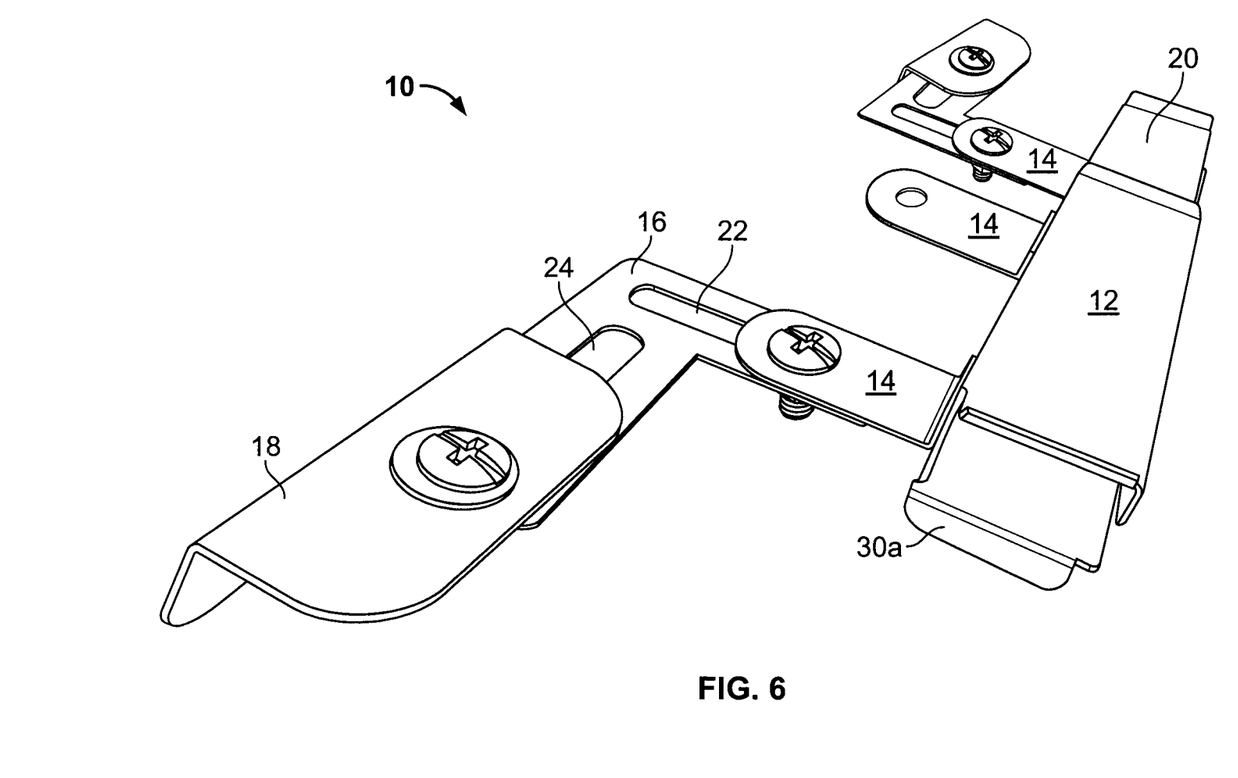
FIG. 6 is a side-view of the universal crossover of FIG. 5.
Figure 7:
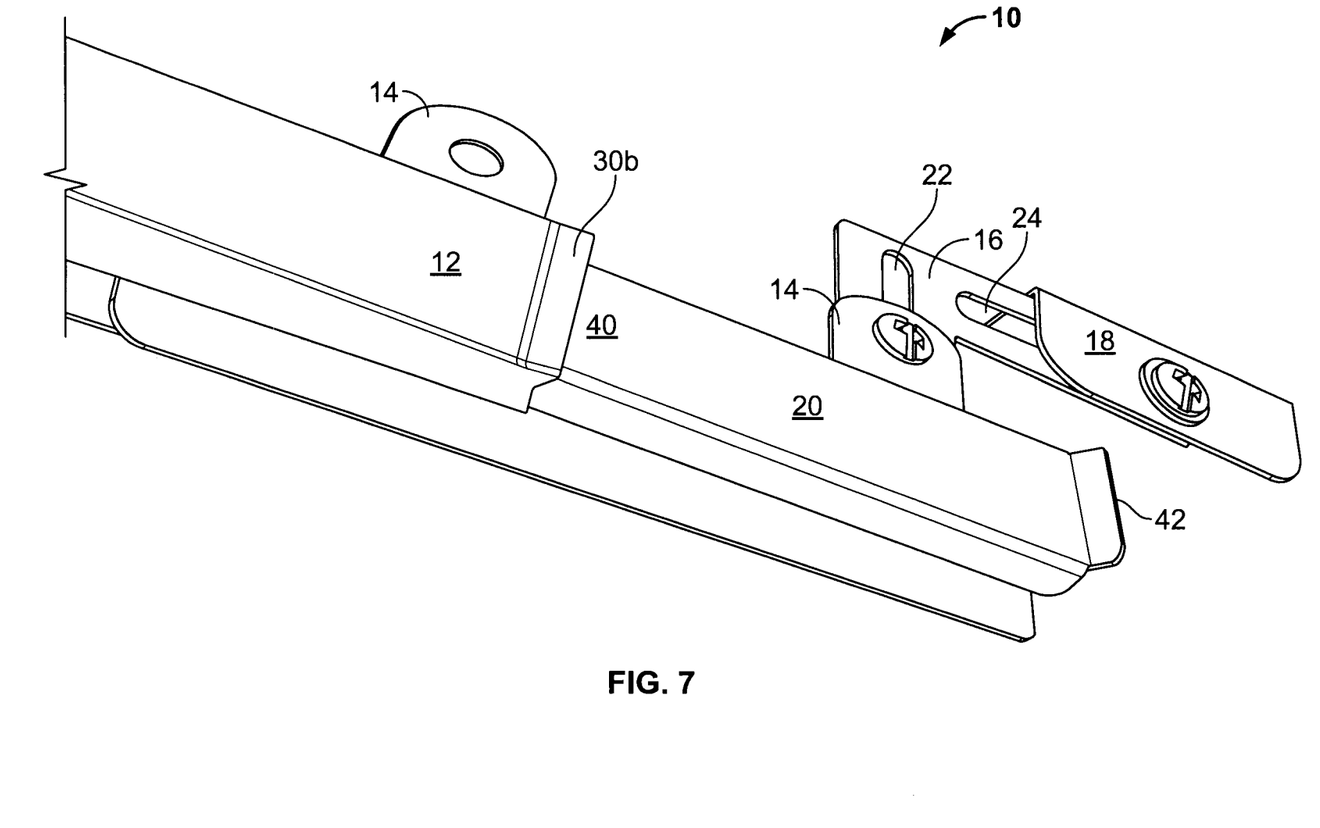
FIG. 7 bottom-up view of the universal crossover of FIG. 6.

FIG. 6 provides a closer look at one open end 22 of the primary crossover body 12. The open end 30a is positioned proximate a burner and is configured to be in communication with the burner. FIG. 7 provides a closer look at the crossover extension 20 inserted into the primary crossover body 12. The crossover extension 20 is shaped such that it fits snugly into the primary crossover body 12. An insertion end 40 of the crossover extension 20 is shaped to be inserted into the primary crossover body 12, while a burner end 42 is shaped similarly to the ends of the primary crossover body 12 and configured to be placed in communication with a burner. It should be appreciated that the shape of the crossover extension 20 makes it possible for another crossover extension to be inserted into the burner end 42 of the first crossover extension 20, should a crossover channel of greater than 7.5 inches be required.

In the foregoing specification, embodiments of the disclosure have been described with reference to specific exemplary features thereof. It will, however, be evident that various modifications and changes may be made thereto without departing from the broader spirit and scope of the disclosure. The specification and figures are, accordingly, to be regarded in an illustrative rather than a restrictive sense. As such, the disclose is defined only by the following claims and recited limitations.

The invention claimed is:

1. A universal crossover channel for use in gas grills comprising:
    a hollow, length-adjustable body having openings on a first end and a second end;
    a first bracket mounted proximate the first end of the hollow, length-adjustable body; and
    a second bracket mounted proximate the second end of the hollow length-adjustable body, wherein the first and second brackets are adjustably mounted to the length-adjustable body using one or more screws, the first and second brackets each comprise an elongated opening, the elongated opening on each of the first and second brackets is configured to mount the universal crossover channel on a gas grill, and the elongated opening on each of the first and second brackets permits the first and second brackets to be compatible with a plurality of grill mounting configurations.

2. The universal crossover channel of claim 1, wherein the first bracket is configured to be mounted on a first grill burner, and the second bracket is configured to be mounted on a second grill burner.

3. The universal crossover channel of claim 1, wherein the first and second brackets are configured to be mounted to a grill firebox wall.

4. The universal crossover channel of claim 1, wherein the elongated openings on each of the first and second brackets permit the first and second brackets to be re-positioned on the length-adjustable body.

5. The universal crossover channel of claim 4, wherein the first and second brackets each comprise a second elongated opening for mounting the universal crossover channel on a gas grill, the second elongated opening on each of the first and second brackets assisting in making the first and second brackets compatible with a plurality of grill mounting configurations.

6. The universal crossover channel of claim 1, wherein
the hollow, length-adjustable body comprises a first body segment and an extension body segment, the extension body segment being insertable into the first body segment, and the length of the length-adjustable body is adjusted by adjusting the position of the extension body segment within the first body segment.

7. A method for using a universal crossover channel, the universal crossover channel comprising a hollow, length-adjustable body having openings on a first end and a second end, a first bracket adjustably mounted proximate the first end of the hollow, length-adjustable body, and a second bracket adjustably mounted proximate the second end of the hollow, length-adjustable body, the method comprising:

adjusting the length of the hollow, length-adjustable body, adjusting the position of the first bracket on the length-adjustable body, adjusting the position of the second bracket on the length-adjustable body, and mounting the universal crossover channel on a gas grill such that the openings on the first and second ends of the length-adjustable body are in communication with a first burner and a second burner, respectively.

8. The method of claim 7, wherein mounting the universal crossover channel on a gas grill comprises mounting the first bracket on a first burner on the gas grill, and mounting the second bracket on a second burner on the gas grill.

9. The method of claim 7, wherein mounting the universal crossover channel on a gas grill comprises mounting the first and second brackets on a grill firebox wall.

10. The method of claim 7, wherein the first and second brackets are adjustably mounted on the length-adjustable body using screws.

11. The method of claim 10, wherein the first and second brackets each comprise an elongated opening.

12. The method of claim 11, wherein the elongated openings on each of the first and second brackets are used for mounting the universal crossover channel on the gas grill.

13. The method of claim 11, wherein the elongated openings on each of the first and second brackets are used for adjusting the positions of the first and second brackets on the length-adjustable body.

14. The method of claim 13, wherein the first and second brackets each further comprise a second elongated opening for mounting the universal crossover channel on the gas grill.

15. The method of claim 7, wherein
the hollow, length adjustable body comprises a first body segment and an extension body segment, the extension body segment being insertable into the first body segment, and adjusting the length of the hollow, length-adjustable body comprises adjusting the position of the extension body segment within the first body segment.

* * * * *